May 15, 1923.
C. J. WESTERGAARD
CREAM RIPENER AND PASTEURIZER
Filed June 30, 1921
1,455,012
2 Sheets-Sheet 1
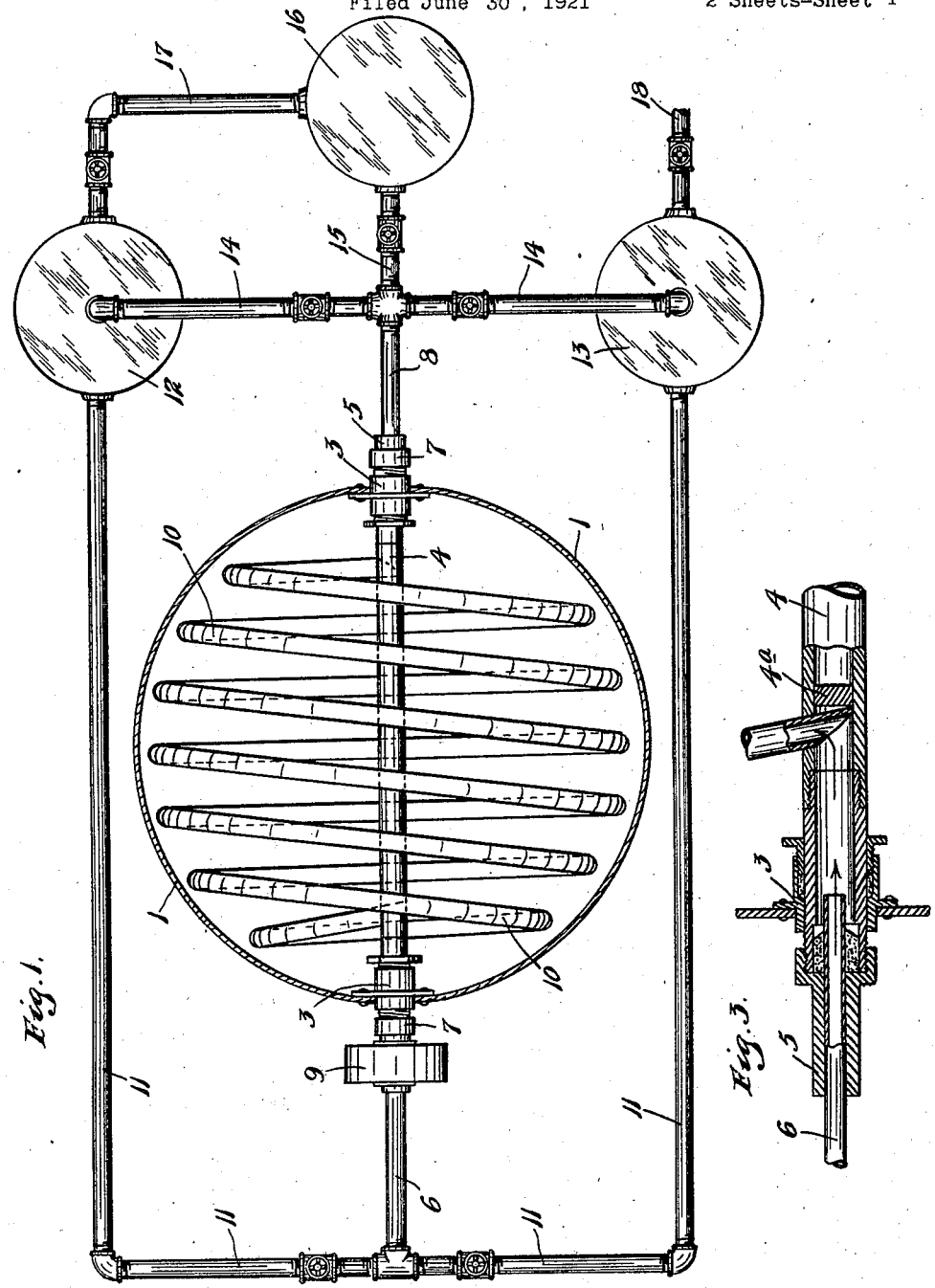
INVENTOR
CARL J. WESTERGAARD,
BY HIS ATTORNEY

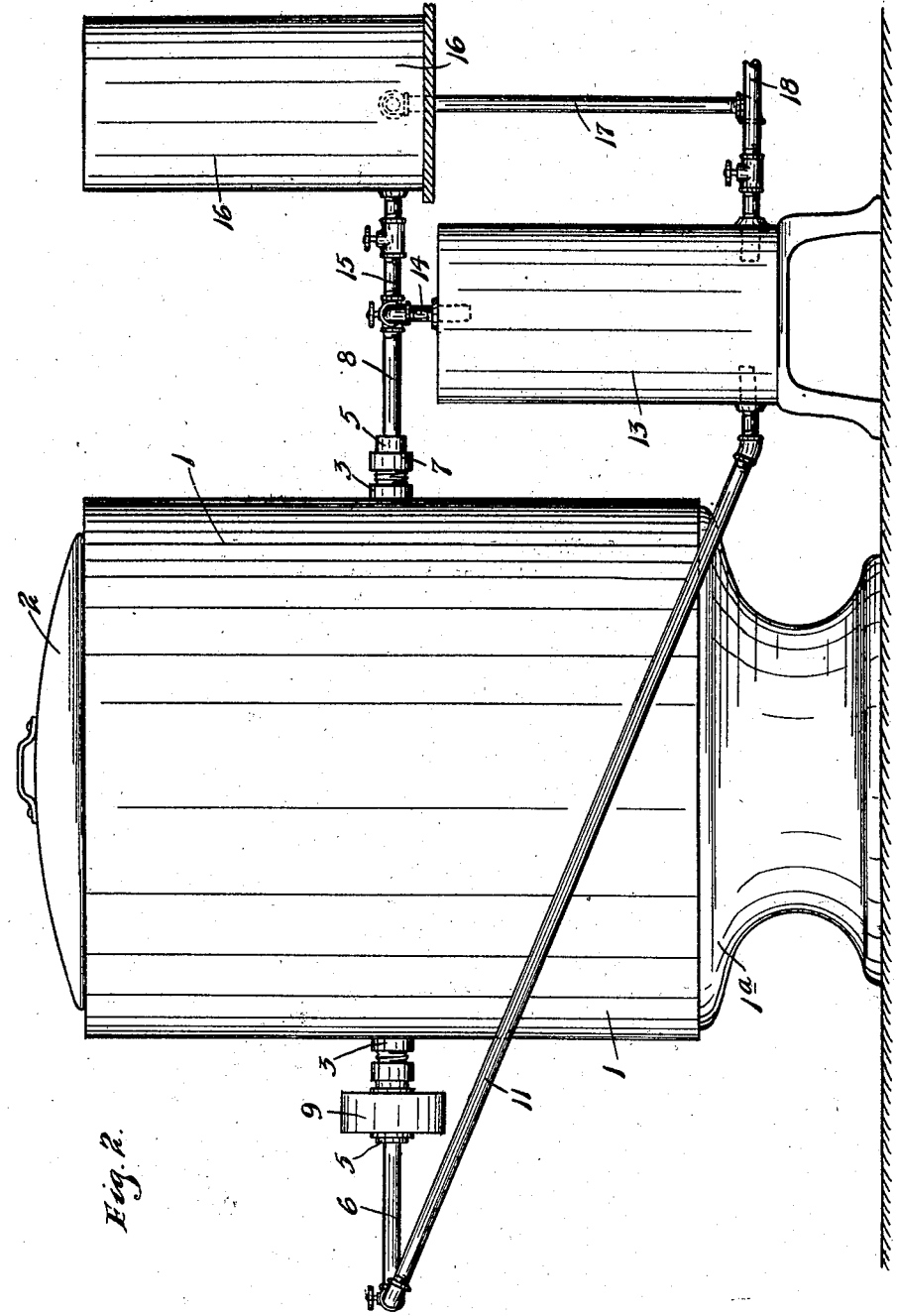

Patented May 15, 1923.

1,455,012

UNITED STATES PATENT OFFICE.

CARL J. WESTERGAARD, OF MINNEAPOLIS, MINNESOTA.

CREAM RIPENER AND PASTEURIZER.

Application filed June 30, 1921. Serial No. 481,689.

*To all whom it may concern:*

Be it known that I, CARL J. WESTERGAARD, a subject of the King of Denmark (but has taken out first papers to become a citizen of the United States), residing at Minneapolis, in the county of Hennepin and State of Minnesota, have invented certain new and useful Improvements in Cream Ripeners and Pasteurizers; and I do hereby declare the following to be a full, clear, and exact description of the invention, such as will enable others skilled in the art to which it appertains to make and use the same.

This invention relates to a cream ripener or pasteurizer, such as is commonly used in creameries and dairies.

It is an object of this invention to provide such a machine of simple and compact form which will not require a great deal of floor space and yet which will be efficient in operation.

It is a further object of the invention to provide such a device comprising an upright cylindrical tank in which is mounted a rotating coil, the convolutions of which are conformed in diameter to the cross section of the tank.

These and other objects and advantages of the invention will be fully set forth in the following description made in connection with the accompanying drawings in which like reference characters refer to the same parts throughout the different views, and in which—

Fig. 1 is a plan view of the device, the cylindrical vessel being shown in section;

Fig. 2 is a view in side elevation of the device; and

Fig. 3 is a sectional view on an enlarged scale of one of the bearings in the tank.

Referring to the drawings, the device comprises an upright cylindrical tank or vessel 1, the height of which is slightly greater than its diameter. This vessel is supported upon a bi-conical base 1ª having a continuous periphery and is also provided at its top with a removable cover 2.

Disposed at opposite sides of the tank substantially midway of its height are hollow bearing members 3 suitably secured to and extending through the walls thereof. A pipe or conduit 4 extends diametrically through the tank and is journaled in the bearing members 3, said bearing members being formed on their inner sides as stuffing boxes and provided with the usual stuffing glands to form fluid-tight bearings. The member 4 is made in sections threaded together adjacent to a bearing 3 to enable the parts to be easily assembled. A sleeve 5 is secured to one end of the pipe 4 outside of the vessel 1 and a pipe connection 6 extends through this sleeve into the pipe 4. At the other end of the pipe 4 a plug or filling sleeve 7 is secured and a pipe connection 8 leads therethrough into the pipe 4, and suitable packing is placed in enlarged recesses in the ends of pipe 4 so that steam or fluid cannot escape therefrom around the pipes 6 and 8. The pipe 4 is mounted for rotation in the bearing members 3 and a pulley 9 is secured to the sleeve 5 and is adapted to be driven from any suitable source of power to turn the same. A coiled pipe member 10 is disposed in the tank 1 about the pipe 4, and has its ends extending into and secured to said pipe in the manner shown in Fig. 3. As shown therein, the ends of the coil are fitted into apertures in the pipe and said ends are cut on a long bevel so that the opening into the coil is substantially the width of the opening in the pipe. A plug member 4ª is placed in the pipe 4 immediately inside of each end of the coil 10 and completely fills the pipe so that fluid therein cannot pass beyond the same. As shown in Fig. 1, the convolutions of the coil 10 vary in diameter and are conformed to the circular shape of the tank 1, the convolutions at the center being the largest and the convolutions decreasing in diameter toward each end of the coil.

The pipe 6 is suitably connected to pipes 11, suitable valves being placed in the latter and the pipes 11 extending into the tanks 12 and 13. The pipe 8 is connected to cross pipes 14, which, in turn, are connected to the tanks 12 and 13 and a pipe 15 also is connected to the pipe 8 and extends into a tank 16, the tanks 12 and 16 being connected by a pipe 17. Suitable valves are placed in the pipes 14, 15 and 17 as well as in steam pipe 18 to variably control the circulation of fluid through the vessel 1.

The operation of the device is as follows:

The cream to be treated will be charged into the tank 1 through the top thereof. If the cream is to be heated, steam will be turned into the pipe 18 from some suitable source of steam supply and the tank 13 will preferably be filled or partially filled with water. The steam passing into the tank 13 will heat the water therein and this water will pass through pipes 11 and 6 into the pipe 4 and into coil 10. Power being applied to the pulley 9 to turn the coil 10, the coil will, by its helical formation, force the water therethrough and the water will thus pass out again through pipes 4 and 8 and through pipe 14 into the tank 13. A circulation of the hot water of the desired temperature will thus be maintained through the coil 10 and the cream in vessel 1 will be treated as desired. The steam is passed through the water in tank 13 so that too hot steam will not enter coil 10 and burn the cream thereon.

If it is desired to cool the cream, a similar circulation of brine which may be supplied in tank 16 will be effected. The brine will pass through pipes 17 and 11 which will be connected through the tank 12 and thence through pipe 6 into the coil 10 and back into the tank 16 through pipes 8 and 15. The brine will be cooled by the usual apparatus used in ice making or refrigerating plants.

In small plants where no freezing apparatus is used or where the same is not always available another tank 12 is supplied with a cooling tank which may be packed with ice and thus contain cool liquid for cooling the material. Such a tank is also useful in connection with a freezing apparatus in case the latter becomes inoperative. When the tank 12 is thus used, the pipes 11 and 17 are not connected therethrough but the pipes 11 and 14 merely connect with the inside of the tank.

From the above description it is seen that applicant has provided a simple and compact cream ripener and one by which a large amount of material may be effectively treated and yet which does not occupy a great deal of space. The peculiar shape of the treating coil enables it to reach a large volume of cream in the tank. The coil acts both to treat the material and to stir the same. The tank and the parts therein will be made of suitably non-corrosive material which will not be acted upon by the material treated.

It will, of course, be understood that various changes may be made in the form, details and arrangement of the device without departing from the scope of applicant's invention, which, generally stated, consists in the matter shown and described and set forth in the appended claim.

What is claimed is:

A cream ripener and pasteurizer having in combination a base having a circular top, a single vertical cylindrical vessel secured to said base and of substantially the same diameter as the top thereof, bearings at opposite sides of said vessel extending through the walls of the same, a pipe rotatably mounted in said bearings and a coil secured to said pipe and communicating therewith at its ends, the longitudinal axis of the coil thus being normal to the axis of said vessel, said coil having its convolutions of different diameter conforming to the curvature of said vessel.

In testimony whereof I affix my signature.

CARL J. WESTERGAARD.